Figures 1, 2:
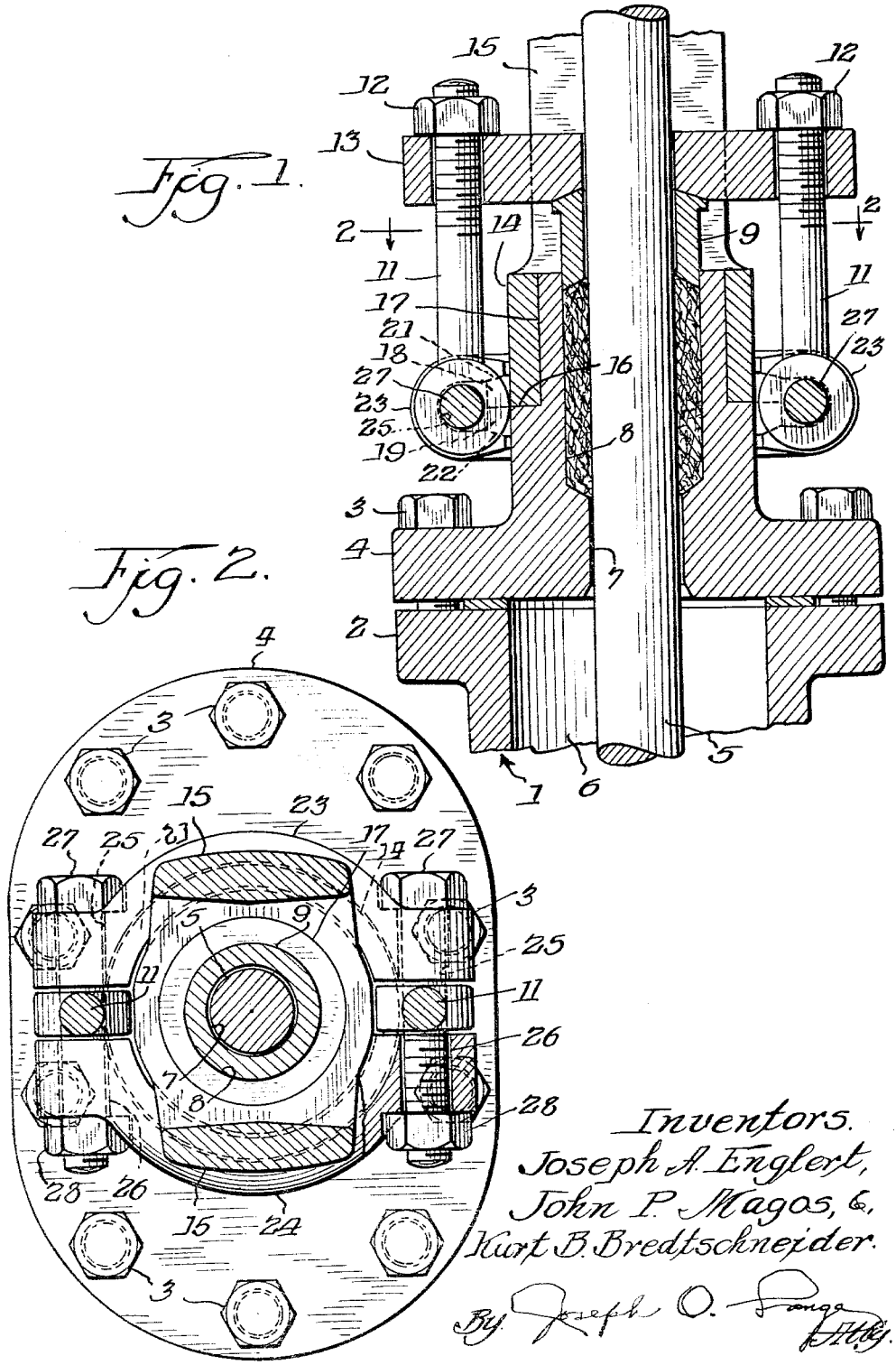

Dec. 22, 1964   J. A. ENGLERT ETAL   3,162,454
STUFFING BOX EYE-BOLT-CLAMP CONSTRUCTION FOR VALVES
Filed May 22, 1963   2 Sheets-Sheet 1

Inventors.
Joseph A. Englert,
John P. Magos, &
Kurt B. Bredtschneider.
By Joseph O. Lange
Atty.

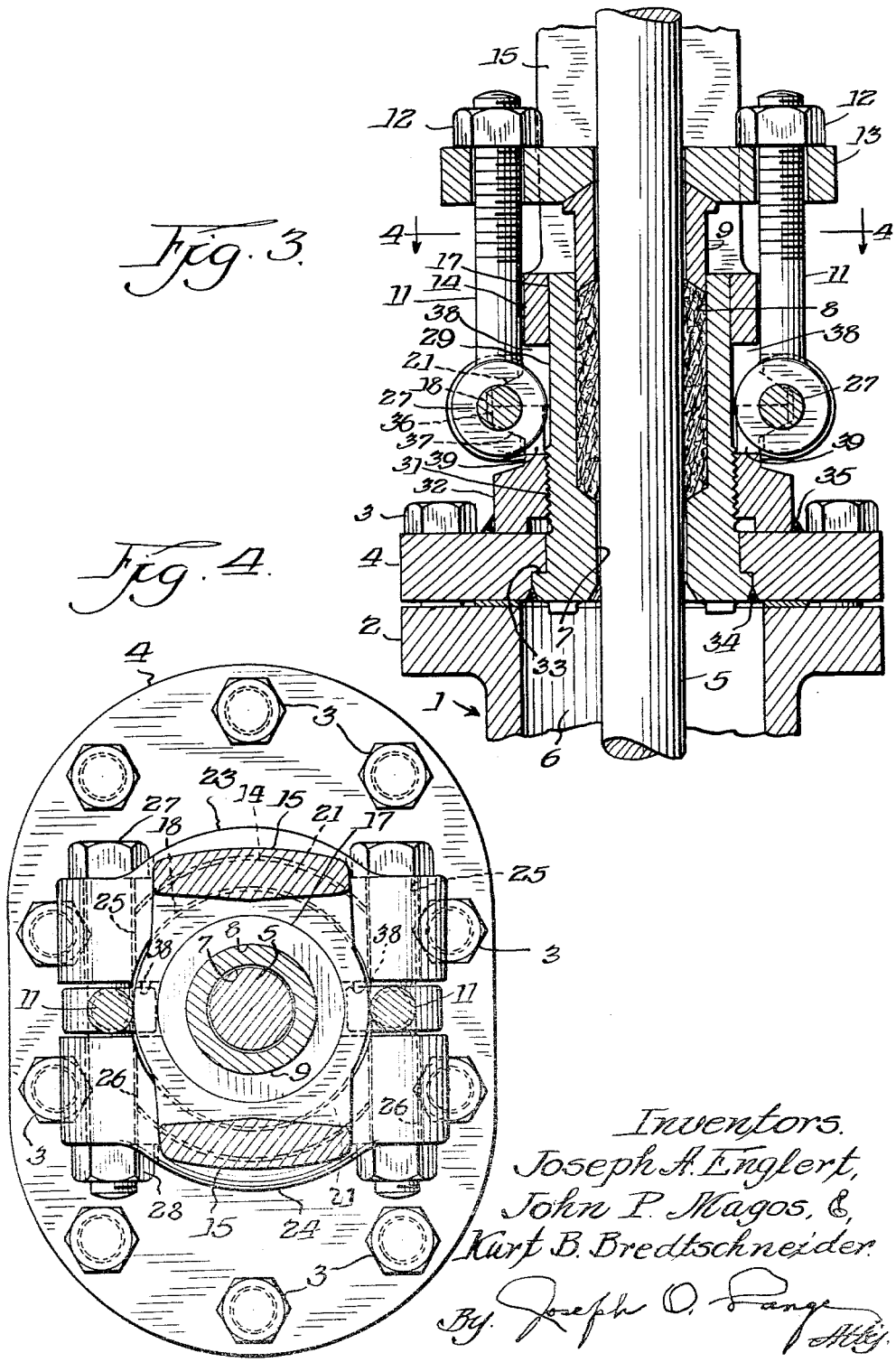
Dec. 22, 1964     J. A. ENGLERT ETAL     3,162,454
STUFFING BOX EYE-BOLT-CLAMP CONSTRUCTION FOR VALVES
Filed May 22, 1963     2 Sheets-Sheet 2
Inventors.
Joseph A. Englert,
John P. Magos, &
Kurt B. Bredtschneider.
By Joseph O. Lange
Atty.

United States Patent Office 3,162,454
Patented Dec. 22, 1964

3,162,454
STUFFING BOX EYE-BOLT-CLAMP CONSTRUCTION FOR VALVES
Joseph A. Englert, Chicago, John P. Magos, Wilmette, and Kurt B. Bredtschneider, Chicago, Ill., assignors to Crane Co., Chicago, Ill., a corporation of Illinois
Filed May 22, 1963, Ser. No. 282,365
3 Claims. (Cl. 277—105)

This invention relates generally to a split clamp construction for gland bolts and stuffing boxes, and, more particularly, it is concerned with the type of stuffing box and gland construction suitable not only for valves, but also for other types of pressure vessels, such as pumps, or the like, in which a reciprocating or rotating or a combined reciprocating and rotating shaft is employed in a fluid tight mounting or bearing.

At the outset, in order to have a better appreciation of the inventive concept involved here, it should be understood that in compressing the packing in the stuffing box, frequently, the latter is tightened by means of threaded gland nuts or a gland flange employing stud bolts or eye bolts to compress said packing. The objection to such designs, particularly where threaded gland nuts are employed, is the expense in maintenance of a stuffing box, and further, the excessively high torque required in tightening said gland nuts necessitating the use of large and cumbersome wrenches. The latter are obviously difficult to handle because the space between the yoke arms is relatively restricted.

A further objection to the use of the more easily retained eye bolt designs lies in the fact that the ears for the eye bolts usually positioned on the bonnet or on the yoke are difficult to cast and the drilling for eye bolt pins necessitates an extra machining operation involving the use of costly drilling features.

A further objection to the prior constructions lies in the fact that the conventional eye bolt and designs previously employed do not permit of mounting the gland bolts sufficiently close to the stem central axis and thus cause the bending moment on the gland flange to be reduced to a minimum, as well as maintaing flange dimensions to a desirable proportion.

A further objection to prior constructions is in the fact that the eye bolt pins in the course of service frequently become loosened and the gland eye bolts are then easily lost or dropped into inaccessible areas during the packing of the stuffing box.

Accordingly, it is an important object of this invention to provide a gland and stuffing box construction in which the eye bolts employed therefor are beneficially positioned so as to be incapable of becoming loosened and lost.

A further object is to provide for a gland eye bolt mounting in which the eye bolt is securely received upon the same retaining means used for tightening a split clamp in holding the latter together.

Another object in providing for greater compactness in one of several forms affecting the positioning of the gland eye bolts is to provide for a yoke construction in which a portion of the eye bolts is securely positioned within a recessed portion of a wall of the yoke to obtain the compactness referred to.

Another object is to provide for a gland eye bolt construction in which the eye bolts are mounted on the same axis as the clamp bolts employed to draw the split clamp together in effecting the mounting of the yoke to the stuffing box.

A further object is to provide for a gland eye bolt construction in which the eye bolts cannot be removed except upon removal of the split clamp, the clamp bolts serving as the axis of rotation for the gland eye bolts.

Other objects and advantages will become more readily apparent upon proceeding with the following description read in light of the accompanying drawings, in which:

FIG. 1 is a fragmentary sectional assembly view of a preferred embodiment of our invention;
FIG. 2 is a fragmentary sectional view taken on the line 2—2 of FIG. 1;
FIG. 3 is a fragmentary sectional assembly view of a modified form of the invention; and
FIG. 4 is a sectional assembly view taken on the line 4—4 of FIG. 3.

Similar reference numerals refer to similar parts throughout the several views.

Referring now to FIG. 1, the end portion of a pressure vessel generally designated 1, such as a valve body, for example, is provided with connecting bonnet flange 2 connected by means of a plurality of bolts 3 to a bonnet or cover 4. A valve stem or pump shaft as the case may be, and as indicated at 5, projects from the chamber 6 through the bonnet 4 as at 7, the latter opening communicating with a stuffing box 8 within which the gland 9 enters in the usual manner of a stuffing box gland to compress the packing therewithin. In this construction, the stuffing box is preferably an integral part of the bonnet 4. For the purpose of compressing said packing, the oppositely disposed eye bolts 11 are employed having the usual tightening nuts 12 bearing against the gland flange 13 to bear upon the gland 9 in the manner illustrated. A yoke member 14 having the usual oppositely disposed arms 15, as shown more clearly in FIG. 2, is joined to the bonnet 4 so as to be supported on the annular surface thereof indicated at 16 and snugly engaging the hub portion 17 of the bonnet as shown, thereby to align the yoke with the bonnet. The immediate adjoining portions of the yoke and bonnet as at 18 and 19 respectively are of flanged configuration, having the rear surface portions thereof as at 21 and 22 annularly inclined to receive a split clamp consisting of the oppositely disposed halves 23 and 24 respectively as more clearly shown in FIG. 2. Each of the clamps is apertured as at 25 and 26 respectively to receive the through bolts or studs 27 and retained by means of the tightening nuts 28.

It will be noted that at an intermediate portion of said clamp bolts 27, the eye bolts 11 are pivotally mounted on said bolts 27 whereby to firmly hold the eye bolts 11 upon the clamp bolts 27 for reasons hereinafter explained. Thus, it will be clear that as the split clamp halves 23 and 24 are drawn together to bear upon the respective inclined annular surfaces 21 and 22, the positioning of the eye bolts 11 is simultaneously accomplished. It will, of course, be appreciated that the halves 23 and 24 of the split clamp are formed in such manner as to provide sufficient clearance therebetween to allow for the convenient interpositioning of the eye bolts without binding during the course of assembly of the clamp.

The advantage of such construction obviously lies in that upon loosening and removing the gland nuts 12 and moving the gland flange 13 upwardly, the eye bolts can easily be swivelled outwardly away from the stuffing box and upon lifting the gland 9 and flange 13 to the desired position the stuffing box 8 can then be either repacked or replenished as required. The construction possesses the advantage that the eye bolts 11 permit of such repacking without danger of loss during the operation.

Referring now to the modified form of the invention shown in FIGS. 3 and 4, in which the attachment of the yoke to the stuffing box and the clamping to the bonnet is provided in a somewhat different manner. In this construction, the stuffing box 29 is threaded as at 31 to be engaged by the retaining nut 32, the said stuffing box 29 being annularly shouldered within the bonnet 4 as at 33 and preferably by the annular weld seal as at 34, the member 32 being preferably locked against rotation by means of an annularly disposed weld 35 and thus becomes an inseperable part of the bonnet 4. At the upper portion of the threaded retaining nut 32, the latter member is provided with the annular flange 36 which on its back or underside portion is annularly inclined as at 37. The yoke 14 is similarly provided with the cooperating flange portion 18 having the annular inclined back surface 21 for engagement by the split clamp comprising the oppositely disposed halves 23 and 24 used in the manner previously described in connection with FIGS. 1 and 2, whereby to draw the yoke 14 firmly in abutting relation against the flange portion 36 of the retaining nut 32.

An important element of this invention lies in the structure about to be described. The yoke 14 is provided with the oppositely disposed slots or relieved portions 38 and similarly the retaining nut 32 is relieved to provide the complementary slots 39 to receive the lower portion of the eye bolts as shown more clearly in the sectional view shown in FIG. 3. The purpose of the apertures 38 and 39 in the yoke and retaining member respectively allows for the positioning of the eye bolts 11 upon the clamp bolts 27 in very close proximity to the outer annular wall of the stuffing box 29. This arrangement permits the application of the torque on the nuts 12 to be transmitted through the gland 13 close to the stuffing box defined by the chamber 8. This is a desirable feature in that objectionable bending stresses are avoided on the gland flange 13. Thus, the compression force is applied to the stuffing box packing more compactly and efficiently. Thus, it will be apparent that an easily assembled construction has been provided in which the packing can readily be installed in a stuffing box in a compact and convenient manner.

While only a pair of embodiments have been shown with respect to the invention, it will, of course, be understood that this is for purpose of illustration and not of limitation.

We claim:

1. In a valve construction or the like for supporting an actuating mechanism including a combined bonnet and stuffing box with packing therefor, a stem, a casing, a yoke therefor having a central aperture and a pair of spaced-apart arms, a gland for the stuffing box, means for compressing the packing in the said stuffing box, a bonnet having a hollow elongated hub portion and an annular surface defining the base of said hub portion for supporting and snugly engaging said yoke to align said bonnet accurately with said yoke, divided clamp means for joining said yoke to the combined bonnet and stuffing box, bolt means for drawing said divided clamp means together, the said yoke and the combined bonnet and stuffing box having oppositely disposed flanges with annularly disposed inclined rear surfaces thereon for engagement by complementary inclined surfaces within said divided clamp means, the said means for compressing the said packing in the said combined bonnet and stuffing box comprising a plurality of eye bolts pivotally mounted on said bolt means for drawing said divided clamp means together, the said bonnet hollow hub portion forming at least a portion of said stuffing box and said yoke and bonnet flange having oppositely disposed cut away portions for receiving the said eye-bolts.

2. The subject matter of claim 1, retaining nut means on the combined bonnet and stuffing box for assembling said stuffing box with the said bonnet, the said retaining nut means and said yoke having adjoining complementary recessed portions forming oppositely disposed slots on outer portions thereof for receiving said eye-bolts.

3. The subject matter of claim 2, the said combined bonnet and stuffing box having annular shoulder means therebetween for effecting the alignment of the said bonnet with said stuffing box, said bonnet and yoke being mounted in abutting relation at said oppositely disposed flanges, the said alignment means being above the said oppositely disposed flanges.

References Cited in the file of this patent

UNITED STATES PATENTS

| | | |
|---|---|---|
| 1,866,292 | Carlson | July 5, 1932 |
| 2,563,012 | Dopp et al. | Aug. 7, 1951 |